3,706,006
HEADLIGHT CONTROL SYSTEM FOR VEHICLES
Richard C. Miller, Sr., 1156 Crahen NE.,
Grand Rapids, Mich. 49501
Filed Apr. 1, 1971, Ser. No. 130,164
Int. Cl. B60q 1/02
U.S. Cl. 315—83                                    8 Claims

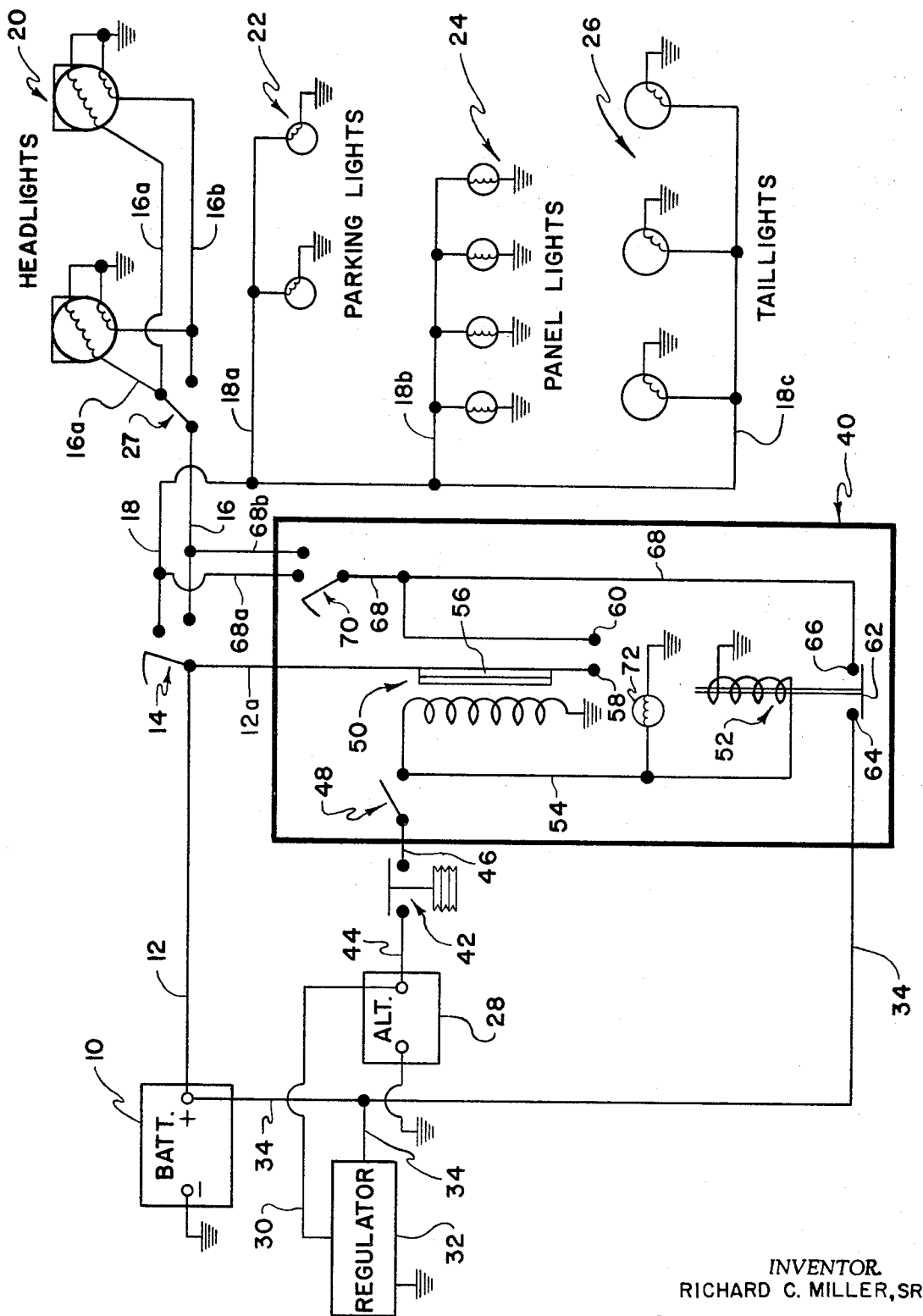

ABSTRACT OF THE DISCLOSURE

A lighting control device for vehicles which can be installed for automatically turning on the lights of the vehicle whenever the vehicle is operated either by day or night for safety purposes. The device includes sensors connected to the alternator or generator of the vehicle and operating through a series of relays to provide power to the vehicle light system regardless of the position of the manually operated lighting switch. Override or defeat switches are also provided wherein the device may be disconnected, and the lighting system will operate in a conventional manner. The device may also function automatically to turn off the lights a predetermined time after the vehicle has been stopped.

BACKGROUND OF THE INVENTION

For safety reasons, it has been found desirable and in many cases recommended by the traffic authorities to drive with the automobile headlights turned on, not only at night, but also during daylight driving hours. It has been proven that it is much easier to see an approaching automobile during daylight hours when the headlights are illuminated as without the headlights shining, various colors of automobiles may blend into the landscape. In many states, "lights on for safety" campaigns have been conducted during long holiday weekends to encourage drivers to travel with their lights turned on at all times.

The most objectionable feature to the daylight "lights on" driving is that often times when the destination is reached the driver will forget to turn the lights off. Consequently, when attempts are made to restart the automobile, the battery is found dead or in a weakened condition resulting in inconvenience and expense to the owner. Various methods for automatically switching the headlight systems of motor vehicles have been proposed in the past. Each of these systems, however, suffers from the drawback that they require extensive wiring changes to the electrical system of the automobile to incorporate them.

SUMMARY OF THE INVENTION

Briefly, the invention comprises a device which includes a relay connected in parallel with the conventional switch of a vehicle electrical lighting system. The relay is in a normally open position until such time as the vehicle's engine is started whereupon a switch responsive to the vehicle's generator output on the engine energizes the relay, causing the parallel connected contacts to turn the vehicle's lighting system on regardless of the position of the manually operated lighting system switch. The system also is preferably provided with a time delay relay connected in parallel with the first-mentioned relay to maintain the lights in an on condition until a predetermined period of time has elapsed. In addition I preferably provide a switch means to render all or part of the device inoperative when it becomes necessary as, for example, when attending a drive-in motion picture when it is desirable to drive without lights or only with the parking lights turned on so as not to disturb the other theatre patrons.

In accordance with the present invention therefor, I provide a device particularly adapted for turning on a vehicle's headlight at any time the vehicle is operated. It is therefore, a primary object of my invention to provide such a device which may be conveniently installed in existing automobiles with minimal rework of the existing electrical system.

It is another object of my invention to provide a system which is responsive to the operation of a vehicle's engine.

It is another object of my invention to provide a vehicle headlight system for turning the vehicle's headlights on whenever the vehicle is operating but which may be rendered inoperative either in whole or in part upon demand.

It is another important object of my invention to provide a vehicle headlighting system which further includes a time delay so that the headlamps will remain in an on condition for a predetermined time after the vehicle is stopped.

These and other objects of my invention will be readily understood by reference to the following specification and accompanying drawing in which the single figure depicts my invention incorporated into a conventional vehicle lighting system.

DESCRIPTION OF THE PREFERRED EMBODIMENT

Turning now to the drawing, a block diagram is shown illustrating the lighting system of a conventional motor vehicle. In its basic form, a vehicle lighting system generally comprises a power supply or battery 10 connected by line 12 to the movable contacts of the vehicle headlamp switch 14. When switch 14 is moved to an on position, current flows through lines 16 and 18 causing headlights 20, parking lights 22, panel lights 24, and taillights 26 to be illuminated. A dimmer switch 27 is generally provided for switching the headlights 20 between a high illumination through line 16a to a low beam illumination through line 16b. The return path for the circuit is, of course, conventional and is grounded through the framework of the vehicle and is illustrated by the ground symbol. The auxiliary lights; parking, panel, and tail are connected at switch 14 through line 18 which has branches 18a to the parking lights 22, line 18b to the panel lights 24, and line 18c to the taillights 26.

A conventional alternator or generator 28 is connected by line 30 to a voltage and current regulator 32 which in turn is connected to the battery 10 through lines 34 and ground to keep the battery fully charged when the vehicle engine is operating.

All of the above-mentioned items, the numbers 10 through 34, illustrate in basic form the conventional motor vehicle light system. The component parts, and the connections thereof are well known to those familiar with this art.

The device of my invention is illustrated in the figure in a block outline generally designated by the numeral 40 and is connected through line 46 to a normally opened vacuum or pressure switch 42 and through line 44 to the vehicle generator or alternator 28. The switch 42, which is required only under certain circumstances is of conventional construction and may be connected to the intake manifold of the vehicle (not shown) and activated whenever the vehicle engine is operating. The other side of the switch is connected through line 46 to a single pole switch 48 which is utilized to render the system inoperative when desired.

When switches 48 and 42 are closed and the vehicle engine operating, a pair of normally opened relays 50 and 52 connected in parallel through line 54 are energized. Relay 50 is a time delay relay which may be of the thermal type dependent upon current flow therethrough to heat a bimetallic element 56 which, when energized, will cause the movable contact member 58 to move to a closed position against a fixed contact element 60.

Relay 52 is a conventional, normally opened, double pole relay having a movable switch contact element 62 which closes the contacts 64 and 66 when the coil of the relay is energized.

One side of each relay (contact 58 of relay 50 and contact 64 of relay 52) are connected by lines 12 and 34 respectively to the positive side of battery 10. At their opposite side, the relay contacts 60 and 66 are connected to each other by line 68 and to a two position double pole switch 70. The switch 70 is illustrated in an off position and may be moved to a first position which will connect line 68 to lint 68a which in turn is connected to line 18 to energize the auxiliary or parking lighting system. In its second position, line 68 will be connected to both lines 68a and 68b, line 68b being connected to the vehicle headlights. In this position, the relay contacts 60 and 66 will be connected through line 68 to switch 70 and lines 68a and 68b to the entire vehicle headlighting system. If desired, an indicator light 72 may be connected to line 54 to indicate when the system is operative.

OPERATION

The vehicle lighting system may be operated in a conventional manner by simply moving the manual switch 14 to connect line 12 through the switch to line 18 or to both lines 16 and 18 to turn the lights on.

Normally, however, the manual switch is not used, and my system is incorporated into the vehicle's electrical lighting system by simply closing switches 48 and 70. These switches are normally left in a closed or on position and remain in such position except for special occasions which will be described more fully hereinafter.

With switches 48 and 70 closed, the vehicle is started in a normal fashion. Switch 42 being in a normally open position, closes due to the presence of pressure in the vehicle's engine system thereby allowing the flow of current from the alternator 28 or other power source through lines 44, switch 42, line 46, switch 48, and line 54 to the relays 50 and 52. Relay 52 is energized instantly upon the closure of switch 42, closing the circuit through the contacts 64 and 66. Current from the battery applied to contact 64 through line 34 continues to flow through lines 68 through switch 70, lines 68a and 68b, lines 16 and 18, to the vehicle lighting system completely bypassing the normal manual headlight switch 14. As long as the vehicle is in operation and switch 42 is closed, the lights will remain turned on.

At the same time relay 52 is closed, current is also applied to the coil or heater element of relay 50 heating the bimetallic element 56 causing contacts 58 and 60 to close. At that time, a circuit is completed through line 12, contacts 58 and 60, to line 68 which is connected in parallel with respect to the contacts of relay 52.

A circuit is also completed through the indicator light 72 from line 54 to give an indication that the system is operational.

So long as the switch 42 is closed and the alternator 28 is operative, the relays 50 and 52 will remain closed and the vehicle lights will remain on.

When the vehicle engine is turned off, the output from the alternator 28 ceases and switch 42 will open thereby breaking the circuit which holds the relays 50 and 52 in an operational position. Relay 52 will immediately open, opening the circuit between contacts 64 and 66. The circuit between contacts 58 and 60 of relay 50 will remain closed, however, for a predetermined time, until the bimetallic element 56 of the relay 50 cools sufficiently to allow the contacts to open. As long as the contacts remain closed, the circuit remains completed through line 12, 12a, contacts 58 and 60, line 68 through switch 70 to lines 16 and 18 and to the lights 20 through 26. This delayed action feature gives the vehicle's operation plenty of time to leave his vehicle at night with the lights on while his path is illuminated until he reaches his destination. After a predetermined period of time, the bimetallic heater element 56 will cool sufficiently and contacts 58 and 60 will open thereby turning the lights off.

Occasionally, for example, at drive-in motion pictures, it is desirable to drive with only the parking lights of the vehicle turned on while the vehicle is operating. The switch 70 is provided for this purpose and may be moved to its first position, that is, so that the circuit from the relay contacts is completed through line 68, switch 70, and line 68a to the auxiliary light circuit through line 18.

It must be realized, of course, that various modifications may be made to the circuit as illustrated. The delay relay 50 may, for example, be provided with a switch at its connection to line 54 to render it inoperative. On the other hand, the relay 50 may be eliminated entirely.

The switch 42 may be connected directly to the battery supply 10 rather than to the alternator. Or again, the switch may be completely eliminated, relying solely on the output of the alternator to energize the relays.

In either event, it will be readily seen that with my invention, I have provided a simple, relatively inexpensive easy to install, safety device for motor vehicles. Actually, when the device is installed, only four connections need be made to the existing vehicle's electrical system. Line 12 and 34 may be internally connected within the enclosure 40 and a single wire brought out to the main fused power supply of the vehicle. Lines 68a and 68b may conveniently be connected to the headlight and auxiliary light system at the manually operated headlight switch. Line 46 may be directly connected to the alternator, or if desired, to a switch which operates when the vehicle engine is running. The entire system may be housed in a small enclosure and mounted under the vehicle dashboard or on the steering column.

While the preferred embodiment of this invention has been illustrated in detail, it will be apparent to those skilled in the art that many modifications thereof may be made without departing from the concept disclosed herein such modifications are to be considered as included in the following claims unless these claims by their language expressly state otherwise.

The embodiments of the invention in which an exclusive property or privilege is claimed are defined as follows.

1. An automatic headlight control device for use in a motor vehicle having headlights, a battery power source, a headlight switch between said headlights and battery power source, and means for charging the battery power source when the vehicle engine is operating, comprising:
 (a) a relay having a coil and a pair of normally opened contact elements;
 (b) first electrical circuit means connected to said relay coil and having a first lead for electrical connection to said charging means, said first circuit means including a normally opened switch in said first circuit means, said switch closing in response to operation of the vehicle engine;
 (c) second electrical circuit means connected to one of said pair of contact elements of said relay and having a second lead for electrical connection to said power source on one side of said headlight switch;
 (d) third electrical circuit means connected to the other of said pair of contacts and having a third lead for electrical connection to said headlights on the other side of said headlight switch, said second and third circuit means providing means for bypassing said headlight switch and providing a closed circuit between said power source and headlights when said relay coil is energized by the output of said charging means; and
 (e) a multi-position switch, connected in series between said other of said pair of contacts and said headlights to selectively apply said power source to said lights.

2. The automatic headlight control device as described in claim 1 and further including means for switching said control device between operative and inoperative positions.

3. The vehicle lighting system control device as described in claim 2 wherein said means for switching said control device between operative and inoperative positions is a single pole, single throw switch connected in series with said first electrical circuit means between said relay coil and said charging means.

4. A vehicle lighting system control device as claimed in claim 1 wherein said normally open switch, which is responsive to the operation of said vehicle, is a pressure switch switchable in response to changes in vehicle engine pressures.

5. An automatic headlight control device for use in a motor vehicle having headlights, a battery power source, a headlight switch between said headlights and battery power source, and means for charging the battery power source when the vehicle engine is operating, comprising:
 (a) a relay having a coil and a pair of normally opened contact elements;
 (b) first electrical circuit means connected to said relay coil and having a first lead for electrical connection to said charging means;
 (c) second electrical circuit means connected to one of said pair of contact elements of said relay and having a second lead for electrical connection to said power source on one side of said headlight switch;
 (d) third electrical circuit means connected to the other of said pair of contacts and having a third lead for electrical connection to said headlights on the other side of said headlight switch; said second and third circuit means providing means for bypassing said headlight switch and providing a closed circuit between said power source and headlights when said relay coil is energized by the output of said charging means; and
 (e) a normally open time delay relay having a coil and contact elements connected in parallel with said coil and said contact elements of said first-mentioned relay respectively, said time delay relay remaining in a closed position a predetermined time after said first-mentioned relay returns to its normally open position to maintain an electrical circuit between said power supply and said lights.

6. In a motor vehicle having a headlight and auxiliary lighting system connected in an electrical circuit to a power source, including a generator, a safety device for controlling said lighting system comprising:
 (a) a relay having a coil and a pair of normally opened contact elements;
 (b) a time delay relay having a coil and a pair of normally open contact elements, the coils of said relays connected in parallel electrical circuit and to said generator to energize same during operation of said generator; said contact elements of said relays connected in parallel, one of said pair of parallel connected contact elements of each relay connected to said power source; the other of said pair of parallel connected contact elements connected to said lighting system to operate said lighting system when said contacts are closed when said relays are energized by the operation of said generator; said contacts of said time delay relay remaining closed a predetermined time after said relay coils are de-energized.

7. In a motor vehicle having a lighting system connected in an electrical circuit to a power source including a generator and a switch between said power source and said lighting system, the improvement comprising: a relay having a coil and a pair of normally open contact elements; first electrical circuit means connected to said relay coil and said generator; second electrical circuit means connected to one of said contact elements and to said power source on one side of said switch; third electrical circuit means connected to the other of said pair of contacts and to said lighting system on the other side of said switch, said second and third electrical circuits forming a circuit in parallel with said switch between said power source and said lighting system; and a normally opened time delay relay having a coil and contact elements connected in parallel with said coil and said contact elements of said first mentioned relay respectively, said time delay relay remaining in a closed position a predetermined time after said first-mentioned relay returns to its normally opened position to thereby maintain an electrical circuit between said power supply and said lighting system.

8. A vehicle lighting system as described in claim 7 and further including a defeat switch connected in series with said first electrical circuit means between said relay coil and said generator for switching said parallel circuit between operative and inoperative positions.

References Cited

UNITED STATES PATENTS

| | | | |
|---|---|---|---|
| 3,430,100 | 2/1969 | Dill, Jr. | 315—82 X |
| 3,365,610 | 1/1968 | Novak | 315—83 |
| 3,376,467 | 4/1968 | Ree | 315—82 |
| 3,414,763 | 12/1968 | Kibler | 315—83 X |

ROY LAKE, Primary Examiner

S. H. GRIMM, Assistant Examiner

U.S. Cl. X.R.

315—315